(12) United States Patent  
Gudaitis et al.

(10) Patent No.: US 11,495,186 B2  
(45) Date of Patent: Nov. 8, 2022

(54) SYNCHRONIZING SCANNING DISPLAY WITH VIDEO

(71) Applicant: Microsoft Technology Licensing, LLC, Redmond, WA (US)

(72) Inventors: Algird Michael Gudaitis, Fall City, WA (US); Mark Alan Champion, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 734 days.

(21) Appl. No.: 16/280,620

(22) Filed: Feb. 20, 2019

(65) Prior Publication Data

US 2019/0373140 A1    Dec. 5, 2019

Related U.S. Application Data

(60) Provisional application No. 62/677,643, filed on May 29, 2018.

(51) Int. Cl.
*G09G 3/34* (2006.01)
*H04N 3/08* (2006.01)
(Continued)

(52) U.S. Cl.
CPC ............ *G09G 3/346* (2013.01); *G09G 3/02* (2013.01); *H04N 3/08* (2013.01); *G02B 26/0858* (2013.01); *G02B 26/101* (2013.01)

(58) Field of Classification Search
CPC .......... G02B 26/0833; G02B 26/0858; G02B 26/101; G02B 26/122; G02B 26/0841;
(Continued)

(56) References Cited

U.S. PATENT DOCUMENTS 9,013,774 B2    4/2015 Ko
2004/0227984 A1*  11/2004 Yamabana ......... G02B 26/0841
359/290
(Continued)

OTHER PUBLICATIONS

"International Search Report and Written Opinion Issued In PCT Patent Application No. PCT/US19/031942", dated Aug. 1, 2019, 11 Pages.

(Continued)

*Primary Examiner* — Richard J Hong
(74) *Attorney, Agent, or Firm* — Alleman Hall Creasman & Tuttle LLP

(57) ABSTRACT

Examples are disclosed herein related to controlling a scanning mirror system. One example provides a display device, comprising a light source, a scanning mirror system configured to scan light from the light source in a first direction at a first, higher scan rate, and in a second direction at a second, lower scan rate, and a drive circuit configured to control the scanning mirror system to display video image data by providing a control signal to the scanning mirror system to control scanning in the second direction, and for each video image data frame of at least a subset of video image data frames, combining the control signal with an adjustment signal to adjust the scanning in the second direction, the adjustment signal comprising a low pass filtered signal with a cutoff frequency based on a lowest resonant frequency of the scanning mirror system in the second direction.

20 Claims, 9 Drawing Sheets

(51) Int. Cl.
*G09G 3/02* (2006.01)
*G02B 26/08* (2006.01)
*G02B 26/10* (2006.01)

(58) Field of Classification Search
CPC .......... G09G 3/02; G09G 3/025; G09G 3/346; G09G 3/001; H04N 3/08; H04N 9/3135; H04N 9/3161; H02P 29/50; H03L 1/04; G01S 7/4802
See application file for complete search history.

(56) References Cited

U.S. PATENT DOCUMENTS

| | | | | |
|---|---|---|---|---|
| 2006/0164330 A1* | 7/2006 | Bright | .................... | G09G 3/001 345/7 |
| 2009/0278619 A1* | 11/2009 | Partridge | .................. | H03L 1/04 331/154 |
| 2010/0073748 A1* | 3/2010 | Holmes | .................... | H02P 29/50 359/199.1 |
| 2010/0079836 A1* | 4/2010 | Rothaar | ............... | G02B 26/101 359/223.1 |
| 2013/0120819 A1* | 5/2013 | Rothaar | ............... | H04N 9/3135 359/224.1 |
| 2014/0168738 A1* | 6/2014 | Ko | ..................... | G02B 26/0833 359/214.1 |
| 2015/0043047 A1* | 2/2015 | Chikaoka | ............... | G09G 3/025 359/199.3 |
| 2017/0280117 A1* | 9/2017 | Ogi | ...................... | H04N 9/3161 |
| 2019/0086517 A1* | 3/2019 | Puglia | .................. | G01S 7/4802 |

OTHER PUBLICATIONS

"Office Action Issued in Indian Patent Application No. 202017050538", dated Aug. 25, 2022, 6 Pages.

* cited by examiner

SYNCHRONIZING SCANNING DISPLAY WITH VIDEO

CROSS REFERENCE TO RELATED APPLICATIONS

This application claims priority to U.S. Provisional Patent Application Ser. No. 62/677,643, filed May 29, 2018, the entirety of which is hereby incorporated herein by reference for all purposes.

BACKGROUND

A display device may scan light from a light source to produce a viewable image. Various scanning systems may be used, including but not limited to scanning mirrors.

SUMMARY

Examples are disclosed herein related to controlling a scanning display system. One example provides a display device comprising a light source; a scanning mirror system configured to scan light from the light source in a first direction at a first, higher scan rate, and in a second direction at a second, lower scan rate; and a drive circuit configured to control the scanning mirror system to display video image data by providing a control signal to the scanning mirror system to control scanning in the second direction, and for each video image data frame of at least a subset of video image data frames, combining the control signal with an adjustment signal to adjust the scanning in the second direction, the adjustment signal comprising a low pass filtered signal with a cutoff frequency based on a lowest resonant frequency of the scanning mirror system in the second direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
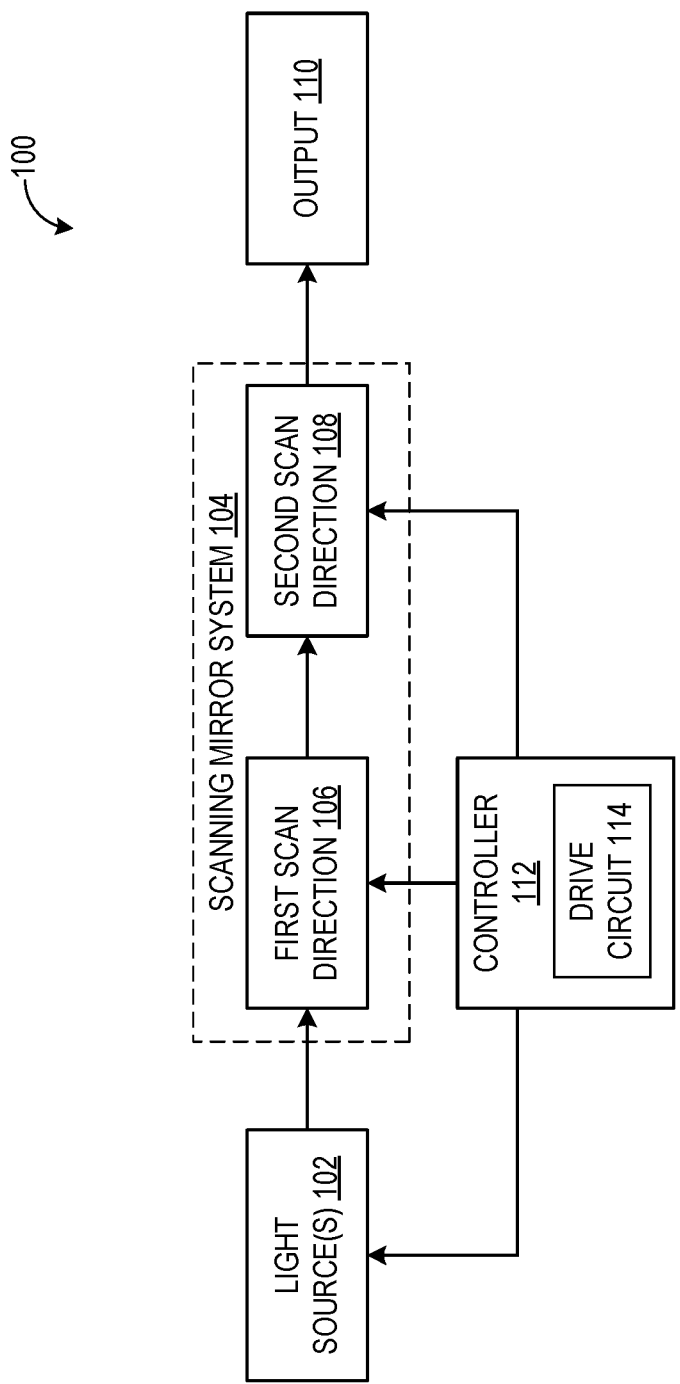
FIG. 1 shows a block diagram of an example MEMS scanning display device.

A scanning display system may utilize a microelectromechanical system (MEMS) mirror system to scan light from a light source to form an image for display. FIG. 1 shows a block diagram of an example MEMS scanning display device. Display device 100 comprises one or more light sources 102, (e.g. lasers) that output light to a scanning mirror system 104. The scanning mirror system 104 is configured to scan the light in a first scan direction 106 (e.g. horizontally) and in a second scan direction 108 (e.g. vertically). The scanning mirror system 104 may include a single mirror driven in both horizontal and vertical directions, or two mirrors separately driven in horizontal and vertical directions. The resulting image is provided to an output 110 for display. Output 110 may assume any suitable form, such as a display surface, projection optics, waveguide optics, etc. As examples, display device 100 may be configured as a virtual reality head-mounted display (HMD) device with output 110 configured as an opaque surface, or as an augmented reality HMD device with the output configured as a see-through structure that allows virtual imagery to be combined with a view of the surrounding real-world environment. Display device 100 may assume other suitable forms, such as that of a head-up display, mobile device screen, monitor, television, etc.

Display device 100 further comprises a controller 112 configured to control operation of the light source(s) 102, scanning mirror system 104 and other device components. The controller 112 comprises a drive circuit 114 configured to provide signals to the scanning mirror system 104 to control scanning in each direction. Different scan rates may be used to scan in the first and second scan directions. For example, the display device 100 may scan in the first scan direction at a resonant frequency of the mirror, and in the second scan direction approximately at a frame rate of the video data. The one or more scanning mirrors may take any suitable form, such as resonant piezoelectric-actuated mirrors.

However, the resonant frequency of the mirror for the faster scan direction may not be an exact multiple of the frame rate of video data being displayed. Unless this issue is mitigated, the scan of images in sequential frames of image data will start at different locations in the image frames. One possible solution to this problem is to apply an adjustment signal to the slow scan mirror during a non-active portion of the scan, e.g. between completing the scan of one frame and starting the scan of the next frame, thereby shifting the position vertically and/or trajectory of the mirror by a suitable amount for the scan of the next frame to start at a correct location. Such an operation may be performed for each frame, or for only a subset of frames, to maintain a suitable level of synchronization between the video data and the scanning mirror system.

However, it may be challenging to achieve a precise shift in position within the duration of a non-active portion of a scan. For example, performing such an adjustment may require the position and velocity of the slow-scanning mirror to be precisely controlled at a frequency that is not the natural resonant frequency of the mirror. Even minute amounts of position error or velocity ripple during an active portion of a scan may create image artifacts. Such artifacts may arise from "ringing" due to harmonic oscillations in the slower scan direction that result from the shift. This ringing must be resolved sufficiently fast to allow the next frame scan to begin without producing visible artifacts.

One possible solution is to apply the adjustment signal as soon as the active portion of a current scan is completed, and then wait until the resonance-dependent "ringing" has decayed to an imperceptible level. However, such waiting may prolong the time when the next active can may begin, which may result in an unacceptable reduction of the scanned image size or frame rate.

Accordingly, examples are disclosed herein that relate to adjusting the scanning in the slower scan direction in a manner that may avoid such ringing. Briefly, the disclosed examples utilize a low pass filtered adjustment signal that includes a cutoff frequency based on a lowest resonant frequency of the vertical scanning mirror. Such an adjustment signal helps to avoid energizing the resonant frequencies of the scanning mirror system in the slow scan direction, and thereby helps to avoid ringing that leads to such artifacts. Further, the use of the low pass filtered adjustment signal also allows the signal to be applied prior to the end of scanning of a prior frame of data, as described in more detail below. The term "low pass filtered adjustment signal" as used herein includes signals that pass through a low pass filter prior to being combined with the control signal, recordings of such signals, and synthetic signals having the characteristics of a low pass filtered adjustment signal as disclosed herein.

Figure 2:
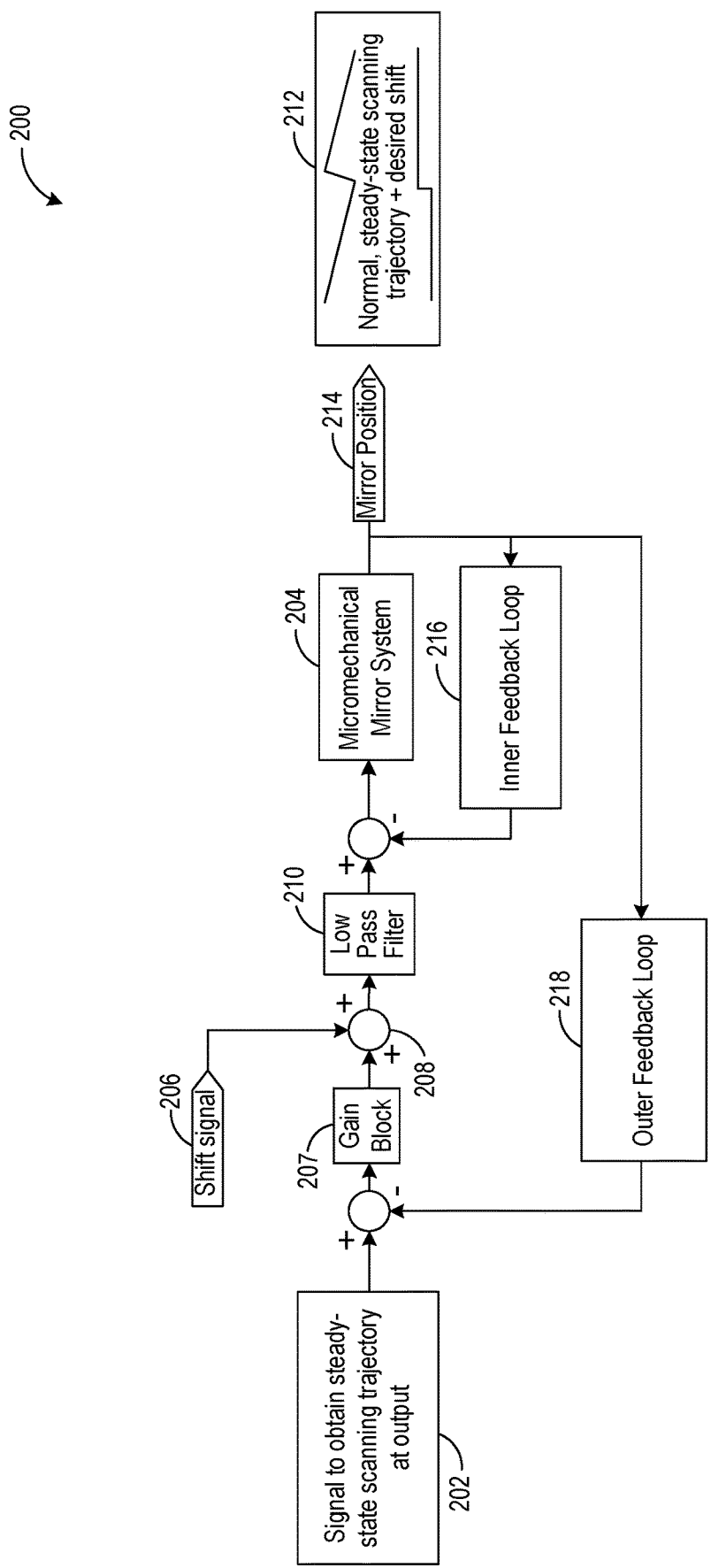
FIG. 2 shows a block diagram of an example MEMS scanning mirror system.

FIG. 2 shows a block diagram of a MEMS mirror scanning system 200 that applies an adjustment signal without low pass filtering prior to summation with the control signal. Block 202 represents circuitry for producing a control signal for obtaining a steady-state scanning trajectory for the slow scan direction of mirror system 204. The control signal, shown schematically as the upper trace in block 212, has the form of a sawtooth in which the long slope represents mirror movement during image scanning and the short slope represents the mirror return between image frames. The control signal is amplified at a gain block 207 and passes through a low pass filter 210 prior to reaching the MEMS mirror system 204 (which may apply additional gain). The resulting mirror position 214 may be continuously provided as feedback to both an inner feedback loop at 216 and an outer feedback loop at 218. The outer feedback loop 218 may be configured to monitor the quality of the steady state trajectory by comparing the received signal to a desired, ideal sawtooth waveform, generate an error signal based on this comparison, and provide the error signal to the inner feedback loop. The inner feedback loop 216 may be configured to apply changes to the control signal to correct for the error signal, helping to achieve a result that is closer to the desired trajectory. System 200 may further comprise a low pass filter 210 between the outer and inner feedback loops. A low pass filter 210 may be used to help the inner loop follow the requested scan trajectory specified by the outer loop.

MEMS mirror scanning system 200 further comprises an adjustment signal circuit 206 configured to add an adjustment signal to the control signal at summing block 208. The adjustment signal, shown schematically as the lower trace in block 212, takes the form of a step. As described above, applying such a step may result in an undesired "ringing" effect due to the high frequency components in the signal, which provide energy to the slow scan direction of the mirror system 204 at one or more resonant frequencies. Applying the adjustment signal upstream of low pass filter 210 may help to reduce some high-frequency components and thus mitigate the ringing to some degree. However, because low pass filter 210 has a relatively wide cutoff frequency region, such mitigation may be inadequate to reduce ringing below a perceptible amount.

Figure 3:
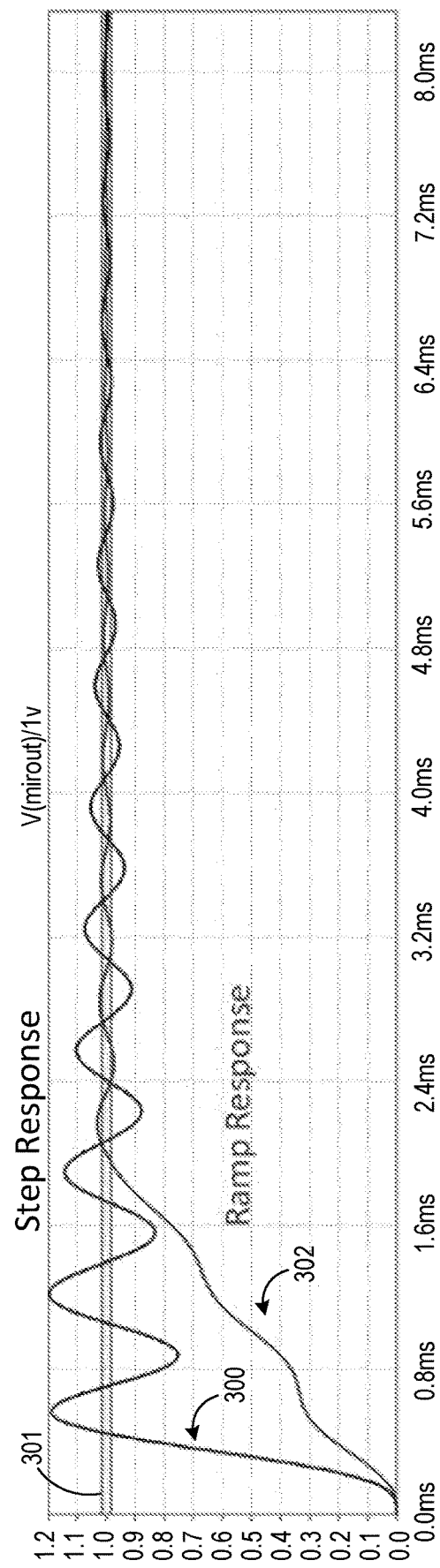
FIG. 3 shows a plot of a positional response of a MEMS mirror to the application of an adjustment signal in the example of FIG. 2.

FIG. 3 shows a plot 300 of a response of an example MEMS mirror to the application of an adjustment signal applied as a step change in the example of FIG. 2. In this example, the adjustment signal is applied after scanning of the prior frame has completed. As illustrated, the step signal adjusts the mirror position to a desired position sufficiently fast; however, the resulting "ringing" of the mirror, shown as oscillations about the desired mirror position, continues at an undesirable magnitude (as shown by example perceptibility band 301) for an unsuitably long duration.

As another possible strategy, instead of a step signal, a more gradual ramp signal may be used as an adjustment signal. However, such a signal still may have high frequency components that energize the mirror system at a resonant frequency. As a result, the use of a sufficiently slow ramp to avoid excessive ringing may result in the ramp being too slow to be performed in the time between image frame scanning. This is illustrated as plot 302 in FIG. 3. While such a ramp signal may help to reduce the prolonged ringing of the response shown in plot 300, the position of the mirror still goes outside the band 301 until the sixth approach to the desired position. Plot 302 reaches the desired position the first time more slowly than plot 300 but settles within the band 301 sooner, though still may not settle as quickly as desired.

As another possible solution to achieve a faster transition, an adjustment step of a larger magnitude than required (an "overshoot") may first be applied, and then a negative, dampening step may be applied to cancel out unwanted effects of the initial signal. Such an overshooting-then-dampening approach may be referred to as a "fine-tuning" method. However, with such a fine-tuning method, the overshoot and dampening steps must be specifically tuned to the system during manufacturing, and may require periodic re-tuning throughout the lifetime of the system to account for changes in the system that may affect the system's natural resonant frequencies (e.g. changes due to heat, age, etc.).

Figure 4:
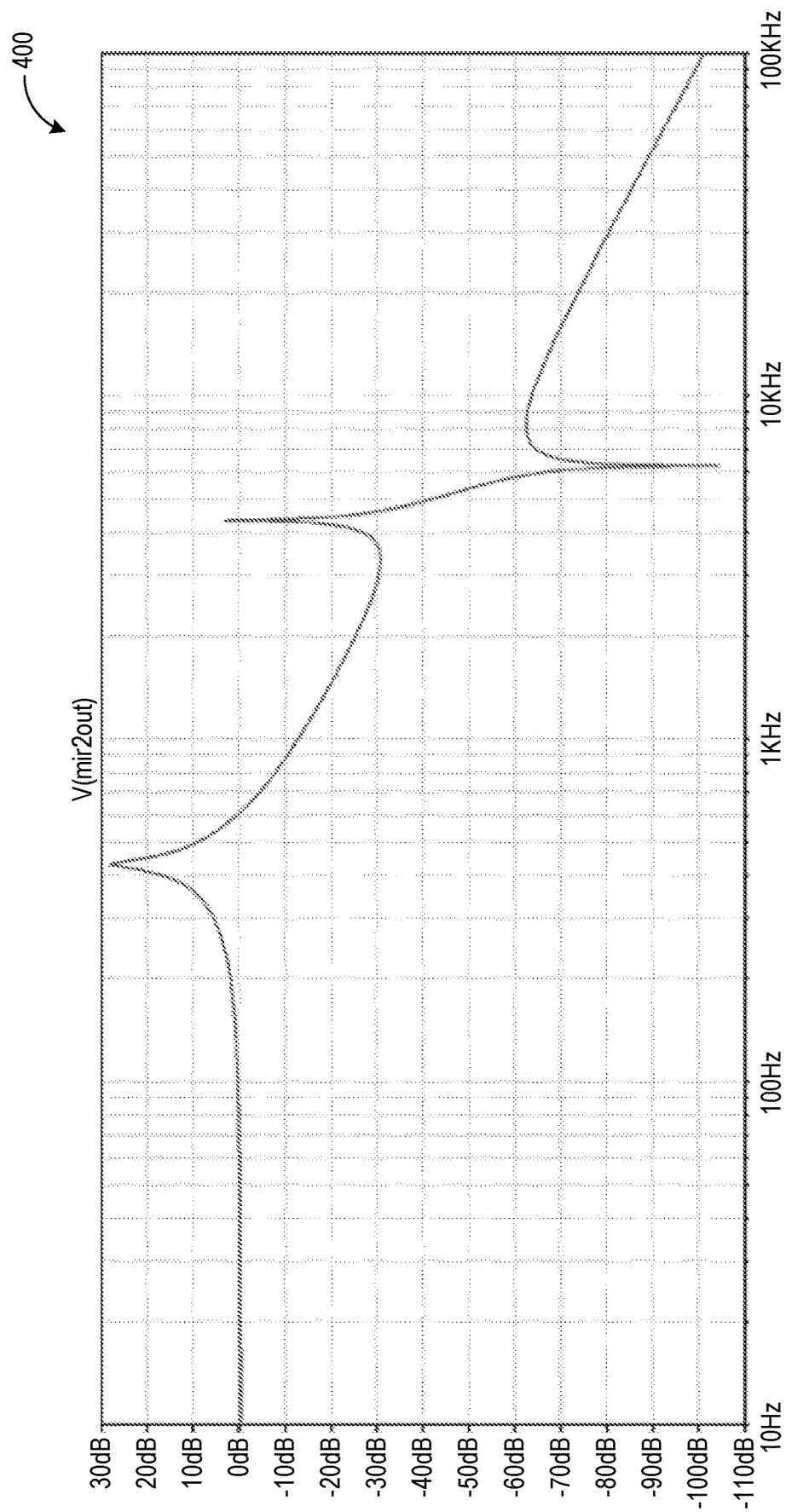
FIG. 4 shows a Bode magnitude plot for an example MEMS mirror scanning system.

FIG. 4 shows a Bode magnitude plot of the frequency response of an example MEMS mirror scanning system (position behavior of the MEMS scanning system versus the input drive), excluding the closed-loop feedback system of FIG. 2 (which may change some of the resonances of the system). When applying a fine-tuning as described above, the goal of various specific overshoot and dampening signals applied would be to essentially form an inverse of the illustrated Bode plot to cancel out the peaks. However, as the system ages or changes, these peaks may change, requiring re-tuning over the device lifetime.

In contrast to the above solutions, the use of a low pass filtered adjustment signal does not require such fine-tuning. More specifically, instead of tuning an adjustment signal to dampen the specific peaks in a Bode magnitude plot, the use of a low pass filtered adjustment signal attenuates frequencies above a cutoff frequency that is based on a lowest anticipated resonant frequency of the slower scanning mirror. As such, no re-tuning of the adjustment signal is needed as the system changes over time (however the cutoff frequency of the low pass filter may be selected to allow for some variation in the resonant frequencies of the system over time to improve response time). The low pass filter applied to the adjustment signal may have any suitable cutoff frequency. In some examples, the low pass filter may be sufficiently close to the lowest resonant frequency of the slower scan direction system to allow some ringing to occur after application of the adjustment signal, as long as the ringing does not create perceptible artifacts (e.g. the magnitude of the artifacts is below a perceptible threshold level).

Figure 5:
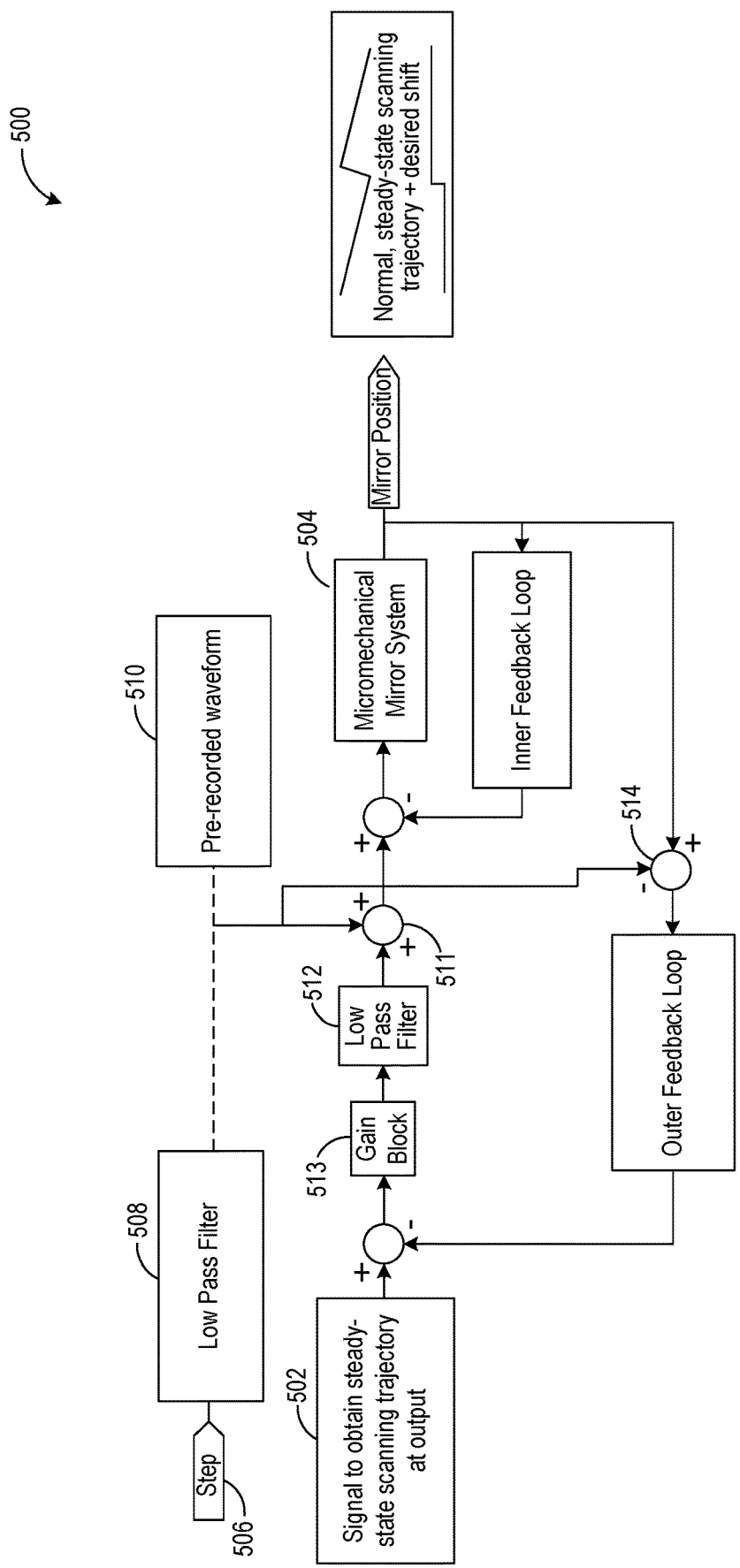
FIG. 5 shows a block diagram of an example MEMS scanning mirror system configured to utilize a low pass filtered adjustment signal.

FIG. 5 shows a block diagram of an example MEMS scanning mirror system 500 configured to synchronize a scanning mirror with a video data frame using a low pass filtered adjustment signal. System 500 is configured similarly to system 200 described above. For example, system 500 comprises a drive circuit configured to generate a control signal for obtaining a steady-state scanning trajectory at 502 to control the MEMS mirror system 504 in the slow scan direction. The control signal passes through a gain block 513 and low pass filter 512 prior to reaching MEMS system 504. MEMS system 504 may apply additional gain.

Further, system 500 comprises an adjustment signal circuit, two examples of which are illustrated at 508 and 510, configured to sum the control signal with a low pass filtered adjustment signal at summing block 511.

First referring to block 508, in some examples the adjustment signal circuit may include a low pass filter for filtering a "step" signal 506. In view of the very short time between image frame scans in which the mirror adjustment is to be performed, it may be desirable to utilize an aggressive low pass filter (e.g. a 12-pole low pass filter), to achieve a narrow cutoff frequency region. This may allow the low pass filter cutoff frequency to be positioned closer to the lowest resonant frequency of the mirror system. In other examples, any other suitable low pass filter may be used. Suitable low pass filters include aggressive low pass filters that do not have any overshoot in the step response that exceeds the desired band size. Next referring to block 510, in other examples the adjustment signal may take the form of a pre-recorded waveform that is intended to reproduce the output of the low pass filter, at 510. In either case, the use of a signal that has been filtered as described herein may help to achieve ringing below a desired percentage of the shift magnitude within the time between frames.

Figure 6:
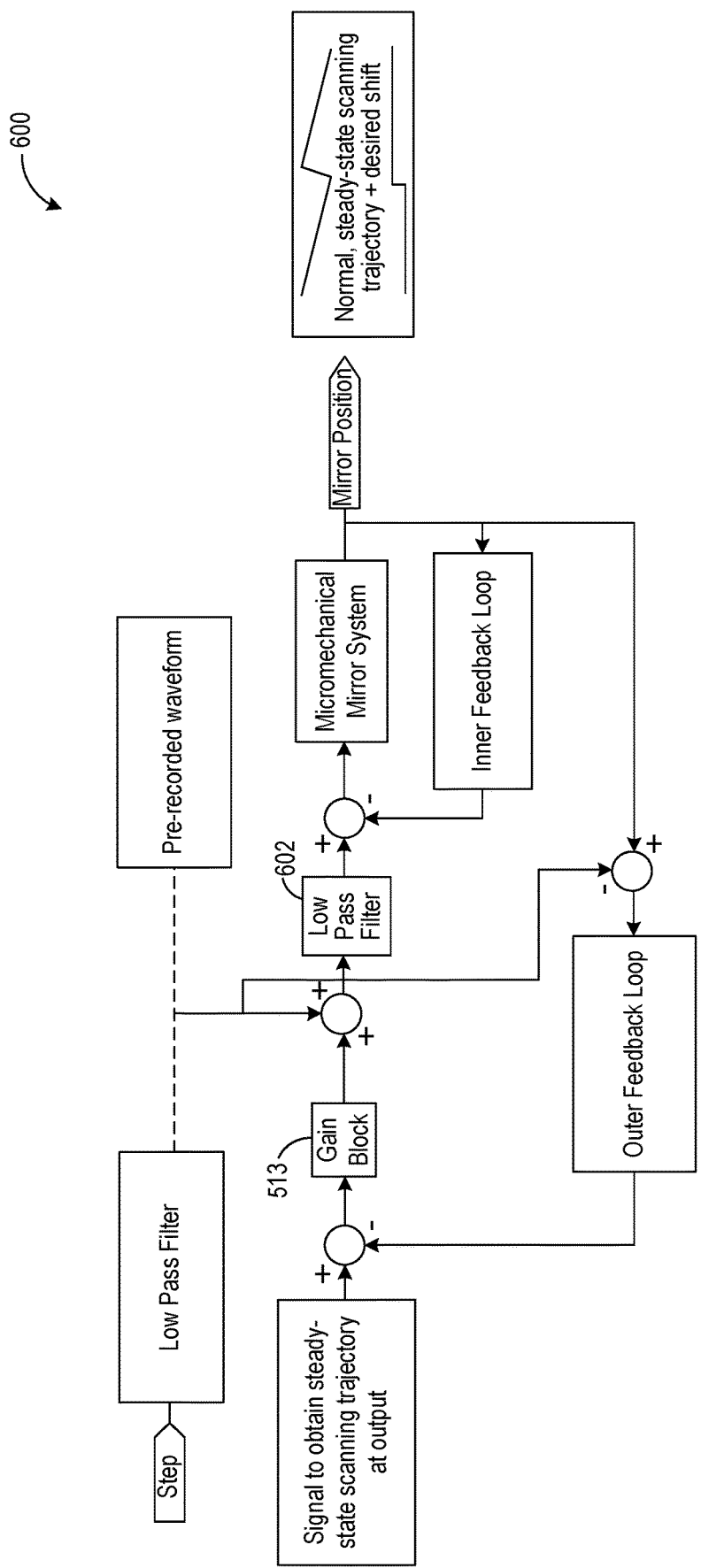
FIG. 6 shows a block diagram of another example MEMS scanning mirror system configured to utilize a low pass filtered adjustment signal.

In the example of FIG. 5, the low pass filtered signal is shown as being combined with the control signal downstream of another low pass filter 512 in the signal path. FIG. 6 shows another example MEMS scanning mirror system 600 in which a low pass filtered signal and the control signal are combined upstream of a low pass filter 602. In such a system, the control signal and/or the adjustment signal may be pre-distorted to proactively "undo" any effect of the downstream low pass filter 602.

Returning to FIG. 5, in some examples, the low pass filtered signal also may be combined with the feedback signal going to the outer feedback loop, at 514. This may help prevent the adjustment in the control signal from being interpreted as a disturbance by the outer feedback loop.

Figure 7:
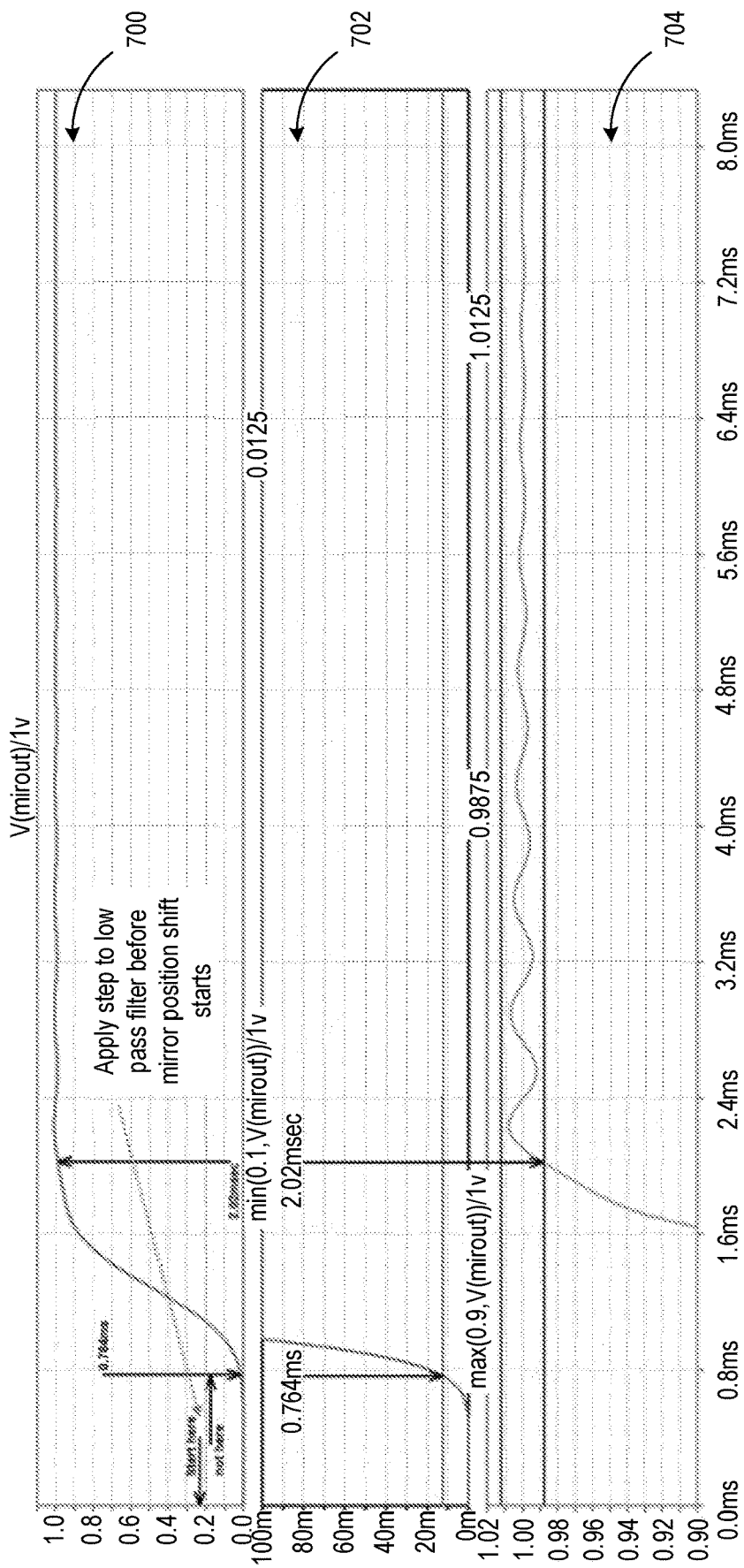
FIG. 7 shows a plot of a positional response of a MEMS mirror to the application of a low pass filtered adjustment signal, and also illustrates magnifications of selected regions of the plot.

FIG. 7 shows a plot 700 of an example response of a MEMS mirror to the application of a low pass filtered adjustment signal. FIG. 7 also shows magnifications 702 and 704 of selected regions of the plot of response 700. First with reference to plot 700, the low pass filtered adjustment signal permits a relatively fast transition between the unadjusted and adjusted signal states. Further, with reference to plot 702, because the low pass filtered adjustment signal has a rounded, relatively gradual initial portion due to the filtering, the mirror response does not reach a perceptibility threshold for a fraction of a millisecond after application of the adjustment signal. As such, the adjustment signal may be applied prior to reaching a last active pixel of a current video image data frame, thereby allowing the adjustment signal to be applied at an earlier time relative to a sharp step or ramp. Once the last pixel of the previous frame is swept, the mirror response ramps up sufficiently fast to reach the desired starting position for the next scan before the start of the first pixel of the next scan. Further, as illustrated, any ringing after application of the signal is beneath the illustrated example perceptibility threshold, thereby allowing the scan of the next image frame immediately upon entering the example perceptibility band. This ringing may be determined based upon how close the cutoff frequency of the low pass filter is to the lowest resonant frequency of the mirror and on a sharpness of the cutoff frequency, and thus can be adjusted by filter design. FIG. 7 shows plot 700 in comparison to the plots caused by adjustment signals without low pass filtering characteristics as described herein.

As can be seen in magnified plot 704, the ramp of the response before reaching the perceptibility band is not a straight incline, but instead becomes less steep as the band is approached due to ringing. In some examples, this may be mitigated by adjusting the input signal applied to the low pass filter. For example, the input signal applied to the low pass filter may include an initial overshoot portion to maintain a desired ramp profile, and thereby to help the mirror reach the desired position more quickly.

Figure 8:
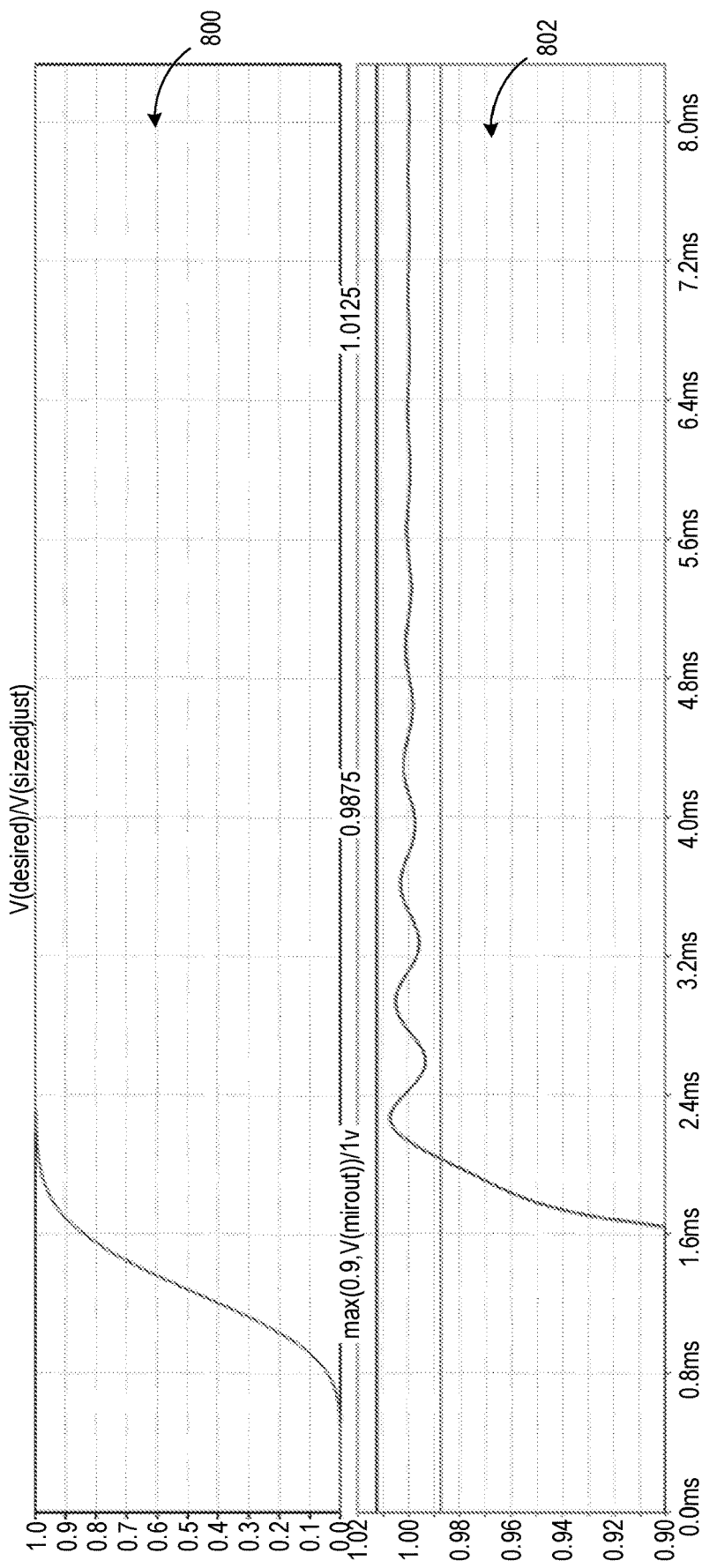
FIG. 8 shows a plot of a low pass filtered adjustment signal and a plot of an overall system output with the low pass filtered adjustment signal applied.

FIG. 8 shows a plot 800 of an output of a low pass filter in an adjustment signal path, and a plot 802 of an overall system output with the low pass filter applied.

While described in the context of a MEMS scanning display device, a low pass filtered adjustment signal as disclosed herein may be used to adjust any other suitable MEMS system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
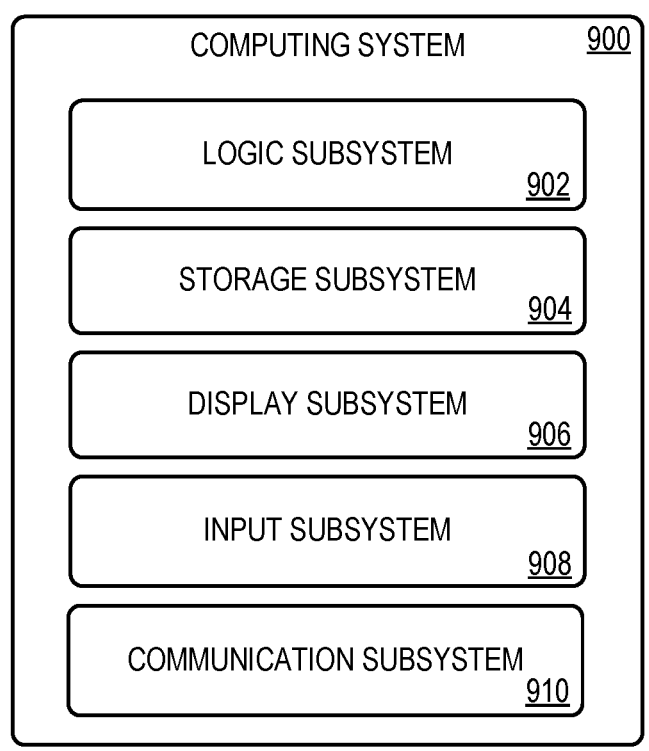
FIG. 9 is a block diagram showing an example computing system.

FIG. 9 schematically shows a non-limiting embodiment of a computing system 900 that can enact one or more of the methods and processes described above. The computing system 900 is shown in simplified form. The computing system 900 may take the form of one or more personal computers, server computers, tablet computers, home-entertainment computers, network computing devices, gaming devices, mobile computing devices, mobile communication devices (e.g., smart phone), wearable devices, and/or other computing devices.

The computing system 900 includes a logic subsystem 902 and a storage subsystem 904. The computing system 900 may optionally include a display subsystem 906, input subsystem 908, communication subsystem 910, and/or other components not shown in FIG. 9.

The logic subsystem 902 includes one or more physical devices configured to execute instructions. For example, the logic subsystem 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 902 may include one or more processors configured to execute software instructions. Additionally or alternatively, the logic subsystem 902 may include one or more hardware or firmware logic machines configured to execute hardware or firmware instructions.

Processors of the logic subsystem 902 may be single-core or multi-core, and the instructions executed thereon may be configured for sequential, parallel, and/or distributed processing. Individual components of the logic subsystem 902 optionally may be distributed among two or more separate devices, which may be remotely located and/or configured for coordinated processing. Aspects of the logic subsystem 902 may be virtualized and executed by remotely accessible, networked computing devices configured in a cloud-computing configuration.

The storage subsystem 904 includes one or more physical devices configured to hold instructions executable by the logic machine to implement the methods and processes described herein. When such methods and processes are implemented, the state of the storage subsystem 904 may be transformed—e.g., to hold different data.

The storage subsystem 904 may include removable and/or built-in devices. The storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 904 may include volatile, nonvolatile, dynamic, static, read/write, read-only, random-access, sequential-access, location-addressable, file-addressable, and/or content-addressable devices.

It will be appreciated that the storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of the logic subsystem 902 and the storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the display subsystem 906 may be used to present a visual representation of data held by the storage subsystem 904. This visual representation may take the form of a graphical user interface (GUI). As the herein described methods and processes change the data held by the storage machine, and thus transform the state of the storage machine, the state of the display subsystem 906 may likewise be transformed to visually represent changes in the underlying data. The display subsystem 906 may include one or more display devices utilizing virtually any type of technology. Such display devices may be combined with the logic subsystem 902 and/or the storage subsystem 904 in a shared enclosure, or such display devices may be peripheral display devices.

When included, the input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 910 may be configured to communicatively couple the computing system 900 with one or more other computing devices. The communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem 910 may allow the computing system 900 to send and/or receive messages to and/or from other devices via a network such as the Internet.

One example provides a display device, comprising a light source, a scanning mirror system configured to scan light from the light source in a first direction at a first, higher scan rate, and in a second direction at a second, lower scan rate, and a drive circuit configured to control the scanning mirror system to display video image data by providing a control signal to the scanning mirror system to control scanning in the second direction, and for each video image data frame of at least a subset of video image data frames, combining the control signal with an adjustment signal to adjust the scanning in the second direction, the adjustment signal comprising a low pass filtered signal with a cutoff frequency based on a lowest resonant frequency of the scanning mirror system in the second direction. The adjustment signal may additionally or alternatively include a pre-recorded signal. The drive circuit may additionally or alternatively include a low pass filter configured to form the adjustment signal from an input signal. The low pass filter may additionally or alternatively include a first low pass filter, the drive circuit may additionally or alternatively include a second low pass filter, and the drive circuit may additionally or alternatively include configured to combine the control signal with the adjustment signal upstream of the second low pass filter. The low pass filter may additionally or alternatively include a first low pass filter, the drive circuit may additionally or alternatively include a second low pass filter, and the drive circuit may additionally or alternatively include configured to combine the control signal with the adjustment signal downstream of the second low pass filter. The input signal provided to the low pass filter may additionally or alternatively include an initial overshoot portion. The scanning mirror system may additionally or alternatively include a same mirror for scanning in the first direction and scanning in the second direction. The scanning mirror system may additionally or alternatively include a first scanning mirror configured to scan light in the first direction, and a second scanning mirror configured to scan light in the second direction. The drive circuit may additionally or alternatively be configured to combine the control signal with the adjustment signal prior to reaching a last active pixel of a current video image data frame. The low pass filter may additionally or alternatively include a multipole low pass filter.

Another example provides display device, comprising a light source, and a scanning mirror system comprising one or more mirrors configured to scan light from the light source in a first direction at a first, higher scan rate, and in a second direction at a second, lower scan rate, a drive circuit configured to provide a drive signal to the one or more mirrors to control scanning in the second direction, and the drive circuit comprising an adjustment circuit configured to provide an adjustment signal to the drive signal to help synchronize the scanning mirror system with a video data frame, the adjustment circuit comprising an adjustment signal source and a low pass filter. The low pass filter may additionally or alternatively be configured to form the adjustment signal from an input signal. The adjustment circuit may additionally or alternatively be configured to provide an initial overshoot portion in the input signal. The low pass filter may additionally or alternatively include a first low pass filter, the drive circuit may additionally or alternatively include a second low pass filter, and the drive circuit may additionally or alternatively include configured to combine the control signal with the adjustment signal upstream of the second low pass filter. The low pass filter may additionally or alternatively include a first low pass filter, the drive circuit may additionally or alternatively include a second low pass filter, and the drive circuit may additionally or alternatively be configured to combine the control signal with the adjustment signal downstream of the second low pass filter. The drive circuit may additionally or alternatively be configured to combine the control signal with the adjustment signal prior to reaching a last active pixel of a current video image data frame. The low pass filter may additionally or alternatively include a multi-pole low pass filter.

Another example provides a method of displaying video images, the method comprising controlling a light source to output light, scanning the light in a first direction at a first, higher scan rate, and scanning the light in a second direction at a second, lower scan rate, and for each video image data frame of at least a subset of video image data frames of video data being displayed, combining a control signal for controlling scanning in the second direction with an adjustment signal to adjust the scanning in the second direction, the adjustment signal comprising a low pass filtered signal with a cutoff frequency based on a lowest resonant frequency of the scanning mirror system in the second direction. Combining the control signal with the adjustment signal may additionally or alternatively include combining the control signal to the adjustment signal prior to reaching a last active pixel of a current video image data frame. The method of claim 18, further comprising applying a low pass filter to an input signal to form the adjustment signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
   a light source;
   a scanning mirror system comprising a mirror, the scanning mirror system configured to scan light from the light source in a first direction at a first, higher scan rate, and in a second direction at a second, lower scan rate; and
   a drive circuit configured to control the scanning mirror system to display video image data by
      providing a control signal to the scanning mirror system to control scanning in the second direction, and
      for each video image data frame of at least a subset of video image data frames, combining the control signal with an adjustment signal to adjust the scanning in the second direction by shifting one or more of a position of the mirror or a trajectory of the mirror for a scan of a next video image data frame to start at a correct location, the adjustment signal comprising a low pass filtered step signal with a cutoff frequency based on a lowest resonant frequency of the scanning mirror system in the second direction.

2. The display device of claim 1, wherein the adjustment signal comprises a pre-recorded signal.

3. The display device of claim 1, wherein the drive circuit further comprises a low pass filter configured to form the adjustment signal from an input signal.

4. The display device of claim 3, wherein the low pass filter is a first low pass filter, wherein the drive circuit comprises a second low pass filter, and wherein the drive circuit is configured to combine the control signal with the adjustment signal upstream of the second low pass filter.

5. The display device of claim 3, wherein the low pass filter is a first low pass filter, wherein the drive circuit comprises a second low pass filter, and wherein the drive circuit is configured to combine the control signal with the adjustment signal downstream of the second low pass filter.

6. The display device of claim 3, wherein the input signal provided to the low pass filter comprises an initial overshoot portion.

7. The display device of claim 1, wherein the mirror is configured for scanning in the first direction and scanning in the second direction.

8. The display device of claim 1, wherein the mirror comprises a second mirror configured to scan in the second direction, and wherein the scanning mirror system further comprises a first mirror configured to scan light in the first direction.

9. The display device of claim 1, wherein the drive circuit is configured to combine the control signal with the adjustment signal prior to reaching a last active pixel of a current video image data frame.

10. The display device of claim 1, wherein the low pass filter comprises a multi-pole low pass filter.

11. A display device, comprising:
    a light source; and
    a mirror system comprising
       one or more mirrors, the scanning mirror system configured to scan light from the light source in a first direction at a first, higher scan rate, and in a second direction at a second, lower scan rate,
       a drive circuit configured to provide a drive signal to a mirror of the one or more mirrors to control scanning in the second direction by shifting one or more of a position of the mirror or a trajectory of the mirror for a scan of a next video image data frame to start at a correct location, and the drive circuit comprising an adjustment circuit configured to provide an adjustment signal comprising a step signal to the drive signal to help synchronize the mirror system with a video data frame, the adjustment circuit comprising an adjustment signal source and a low pass filter.

12. The display device of claim 11, wherein the low pass filter is configured to form the adjustment signal from an input signal.

13. The display device of claim 12, wherein the adjustment circuit is configured to provide an initial overshoot portion in the input signal.

14. The display device of claim 11, wherein the low pass filter is a first low pass filter, wherein the drive circuit comprises a second low pass filter, and wherein the drive circuit is configured to combine the control signal with the adjustment signal upstream of the second low pass filter.

15. The display device of claim 11, wherein the low pass filter is a first low pass filter, wherein the drive circuit comprises a second low pass filter, and wherein the drive circuit is configured to combine the control signal with the adjustment signal downstream of the second low pass filter.

16. The display device of claim 11, wherein the drive circuit is configured to combine the control signal with the adjustment signal prior to reaching a last active pixel of a current video image data frame.

17. The display device of claim 11, wherein the low pass filter comprises a multi-pole low pass filter.

18. A method of displaying video images, the method comprising:
controlling a light source to output light;
controlling a mirror system comprising a mirror, the scanning mirror system configured to scan the light in a first direction at a first, higher scan rate, and scanning the light in a second direction at a second, lower scan rate; and
for each video image data frame of at least a subset of video image data frames of video data being displayed, combining a control signal for controlling scanning in the second direction with an adjustment signal to adjust the scanning in the second direction by shifting one or more of a position of the mirror or a trajectory of the mirror for a scan of a next video image data frame to start at a correct location, the adjustment signal comprising a low pass filtered step signal with a cutoff frequency based on a lowest resonant frequency of the mirror system in the second direction.

19. The method of claim 18, wherein combining the control signal with the adjustment signal comprises combining the control signal to the adjustment signal prior to reaching a last active pixel of a current video image data frame.

20. The method of claim 18, further comprising applying a low pass filter to an input signal to form the adjustment signal.

* * * * *